(12) United States Patent
Shen et al.

(10) Patent No.: US 11,321,459 B2
(45) Date of Patent: May 3, 2022

(54) METHOD, SYSTEM AND APPARATUS FOR ERROR CORRECTION CODING EMBEDDED IN PHYSICALLY UNCLONABLE FUNCTION ARRAYS

(71) Applicant: Intel Corporation, Santa Clara, CA (US)

(72) Inventors: Kuan-Yueh Shen, Portland, OR (US); David Johnston, Hillsboro, OR (US); Rachael J. Parker, Forest Grove, OR (US); Javier Dacuna Santos, Santa Clara, CA (US)

(73) Assignee: INTEL CORPORATION, Santa Clara, CA (US)

(*) Notice: Subject to any disclaimer, the term of this patent is extended or adjusted under 35 U.S.C. 154(b) by 797 days.

(21) Appl. No.: 16/234,348

(22) Filed: Dec. 27, 2018

(65) Prior Publication Data

US 2019/0130103 A1  May 2, 2019

(51) Int. Cl.
| | |
|---|---|
| *G06F 11/00* | (2006.01) |
| *G06F 21/55* | (2013.01) |
| *G06F 11/10* | (2006.01) |
| *H04L 9/32* | (2006.01) |
| *H04L 9/08* | (2006.01) |
| *G06F 7/58* | (2006.01) |
| *G06F 21/00* | (2013.01) |

(52) U.S. Cl.
CPC ............ *G06F 21/556* (2013.01); *G06F 7/588* (2013.01); *G06F 11/1076* (2013.01); *G06F 21/00* (2013.01); *H04L 9/0866* (2013.01); *H04L 9/0894* (2013.01); *H04L 9/3278* (2013.01); *G06F 2221/034* (2013.01); *H04L 2209/34* (2013.01)

(58) Field of Classification Search
CPC ........ G06F 21/00; G06F 21/556; G06F 7/588; H04L 9/0866; H04L 9/0894; H04L 9/3278

See application file for complete search history.

(56) References Cited

U.S. PATENT DOCUMENTS

| | | | | |
|---|---|---|---|---|
| 2010/0054466 | A1* | 3/2010 | Kerins | G06F 7/588 380/46 |
| 2012/0072737 | A1* | 3/2012 | Schrijen | H04L 9/304 713/189 |
| 2019/0116052 | A1* | 4/2019 | Kim | H04L 9/0816 |
| 2019/0130103 | A1* | 5/2019 | Shen | G06F 21/00 |
| 2020/0034549 | A1* | 1/2020 | Lu | G06F 21/73 |

* cited by examiner

*Primary Examiner* — Philip Guyton
(74) *Attorney, Agent, or Firm* — Spectrum IP Law Group LLC (57) ABSTRACT

The disclosure generally provides methods, systems and apparatus for an improved a Physically Unclonable Function (PUF). In one embodiment, the disclosure relates to a method to provide data from a Physically Unclonable Function (PUF) circuit array. The method includes storing a plurality of first data bits into a respective ones of a plurality of first bitcells of the PUF array to form a first dataset; storing a plurality of second data bits into a respective ones of a plurality of second bitcells of the PUF array, the plurality of second data bits defining a helper dataset; reading the first dataset from the plurality of first bitcells to provide a first read dataset; applying an error correction factor to the first read data dataset to form a security key dataset; and outputting the security key dataset from the PUF circuit array.

29 Claims, 7 Drawing Sheets

METHOD, SYSTEM AND APPARATUS FOR ERROR CORRECTION CODING EMBEDDED IN PHYSICALLY UNCLONABLE FUNCTION ARRAYS

BACKGROUND

PUFs (Physically Unclonable Functions) are circuits that create a unique static random value drawn from underlying manufacturing variation. They are an essential component of a comprehensive security architecture. In the absence of PUFs, keys are provisioned and stored in less secure ways. A primary requirement of PUFs is that the value returned remains constant over the lifetime of the device. This is achieved by applying error correction to the PUF data. Consequently, the array must have a sufficiently low Bit Error Rate (BER). BER is a measure in percentage of unstable bits between two consecutive reads per PUF array so that error correction code (ECC) will be able to correct all the errors. The ECC system must store the redundant data (also known as, the helper data) in non-volatile memory (NVM). The helper data can leak information about the PUF value and so the total amount of helper data—and thus the maximum acceptable BER—is limited. There is a need for an improved PUF circuitry with lower BER.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Cryptographic keys (interchangeably, keys) can be stored in a memory circuit. To prevent a key from being exposed during a physical attack, the memory circuit may be configured to sense when a physical attack is occurring and to react to the attack by blocking the supply of power to the circuit or by destroying the circuit. Certain circuit logic (hardware and logic implemented thereon) designs provide a fingerprint-like output which may be used as the key.

PUF circuits are generally configured to take advantage of the fact that wire delay and/or gate delay may differ slightly from one device to the next. This is due to slight manufacturing; variations in circuit formation. A PUF circuit is implemented using gate logic and may generate a random output. The variations in the manufacturing process cause different delays in each circuit. Thus, making it difficult to copy a PUF circuit even if the copied circuit is physically identical and designed to provide the same output value. Certain PUF circuits are extremely difficult to replicate. The same characteristics of PUF circuits that make them difficult to clone also make them susceptible to generating incorrect output values. Entropy is a measure of uniqueness of a PUF circuit. The higher the entropy, the smaller and cheaper a PUF can be while retaining the same level of security.

To overcome this variability, error correction is conventionally implemented to the output of the PUF circuitry. However, the error correction adds additional circuitry to the PUF circuit while the separate helper data of ECC can leak entropy of the PUF. The following illustrate the shortcomings of the conventional PUF circuits.

First, for a narrow sense N=255 Bose-Chaudhuri-Hocquenghem (BCH) code, the entropy remaining in the system after subtracting the information leaked by the BCH helper data falls to 0 bits when a BER of 12.5% or greater is addressed. It is essential to achieve a substantial margin between the actual PUF technology's BER and the 12.5% BER that the conventional BCH circuits can correct. The conventional PUF technology has a native BER that is too close to this limit. There are various sources of transistor mismatches in a PUF bitcell including difference in threshold voltage and mobility between transistor pairs. Such mismatches can have their relative influence over the PUF outcome as a different function of supply voltage, temperature, minor layout mismatch, etc.

Second, A method of stress hardening can be employed to the existing PUF cell using BTI stress (by holding the cell in its opposite logic state with a possibly a higher supply voltage for a period), but this is subject to the stress recovery mechanisms unless the stress is periodically reinforced during run-time with write-back. This adds a potential side channel attack vector thereby rendering the PUF circuit vulnerable.

Third, conventional PUF circuits store the helper data on a chip which uses fuses (or other non-volatile memory (NVM)). Approximately 1000 fuses are used to correct a 2040 bit array and this consumes significantly more area in fuses that is consumed by the PUF array.

Previous solutions have included using BTI stress to harden the PUF circuit. The purported post-stress BER is evaluated in a narrow temperature range of 25 to 50° C. (while the industry requires a temperature range of about −40 to 125° C.). As for the ECC, the previous solutions programed the helper data to a fuse array or an NVM. However, storing the helper data in fuses or NVM is not secure against probing and other attacks. Further, fuses or off-die NVM increase manufacturing cost. Lastly, the drive degradation caused by BTI stress is recoverable or partially relaxed after interruption of stress.

To address these and other shortcomings of the art, an embodiment of the disclosure relates to a PUF technology in which the PUF array cells are hardened to their intrinsic value as determined by their pre-stress variation. In another exemplary embodiment, the PUF array cells are programmed to a specific value regardless of the pre-stress variation.

In yet another embodiment, the error correction system programs helper data into the PUF array itself (i.e., the helper data is programmed within the PUF array area on the same solid-state microprocessor that defines the PUF circuitry). This eliminates the need to store the helper data into fuses or off chip NVM.

In an exemplary implementation, the PUF cell allows selective hardening or programming through exploiting the shift in transistor electrostatics or ON current (Ion) by intentional hot carrier (HC) stress to electrically differentiate a nominally matched transistor pair, thus stabilizing or overwriting the output tendency of a latch from its meta-stable point, or trip point.

Among others, the disclosed embodiments make it unlikely to probe for helper data, thus lowering the entropy loss through helper data. This makes attacks more expensive. The disclosed embodiments also reduce the PUF's BER to close to zero; thereby (1) reducing number of PUF bits and PUF array area; (2) reducing or eliminating the cost of fuse or NVM area required for helper data; and (3) allowing a less complex ECC algorithm and logic. Further, part of the PUF array can be assigned as One Time Program (OTP) by long HC stress, replacing the required ECC NVM or fuse. The integration of the two arrays (i.e., the PUF circuit array and the ECC circuit array) with randomized column and row access greatly obfuscates invasive attackers since the two arrays share identical layout and have no physical partition.

Figure 1:
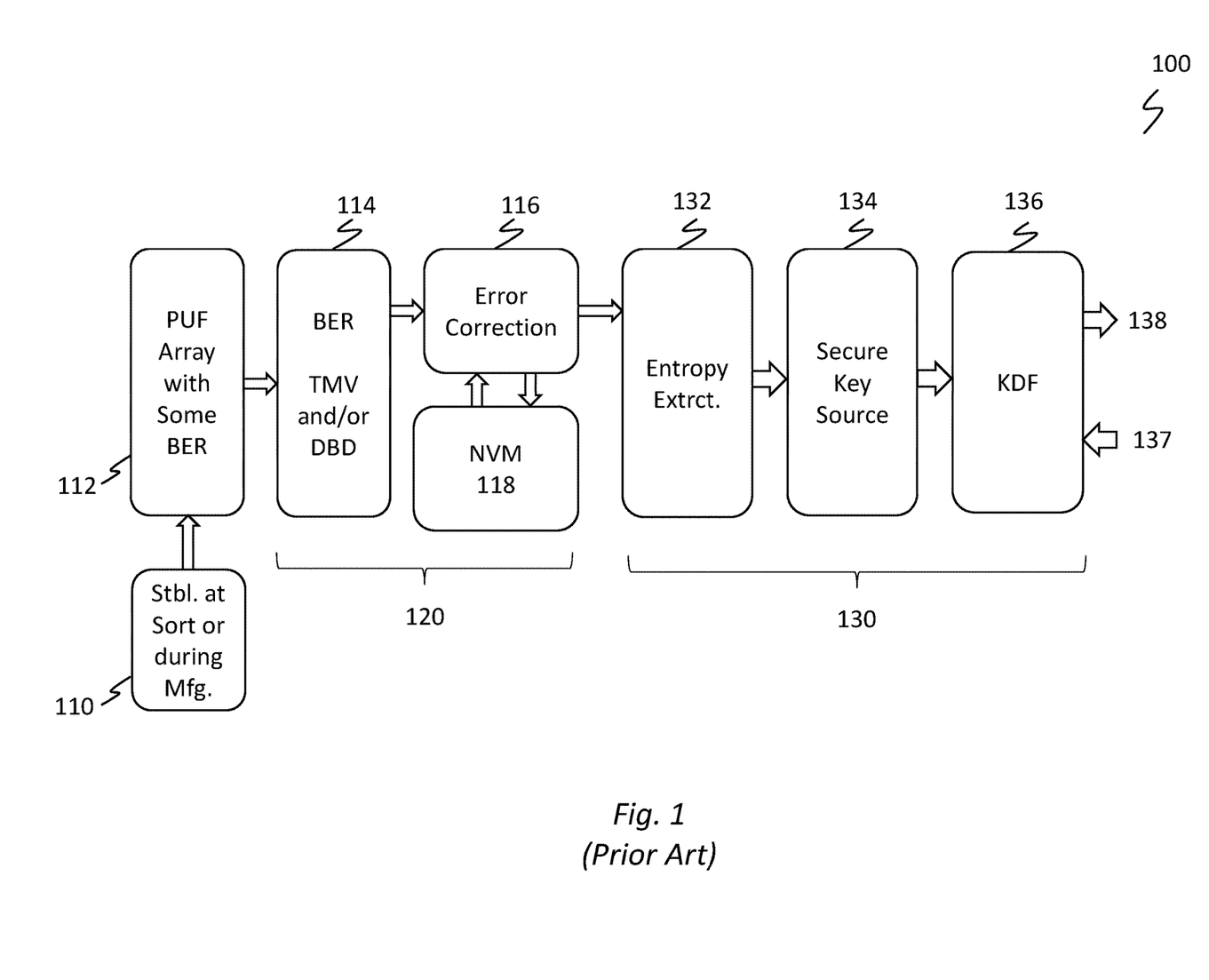
FIG. 1 schematically illustrates a conventional PUF-based security key hierarchy.

FIG. 1 schematically illustrates a conventional PUF-based security key hierarchy. Specifically, architecture 100 of FIG. 1 shows a PUF-based hierarchy with NVM (or fuse) and its data path. Box 110 in FIG. 1 represents stabilization at Sorting or during manufacturing. Sort, last section of the whole manufacturing process before a wafer is cut into dies for packaging, electrically tests functions of each uncut die at a specific temperature and sequence. Sort finds what dies should be dropped (no packaging) and, for the survived, what are the "rank". For example, a die may be of a top bin, and should be sold as a premium grade processor.

The stabilization during manufacturing results in PUF array 112 which produces some bit error rate. PUF array 112 may comprise an array of electronic cells configured to each hold a respective data bit. Such cells are identified as bitcells or memory cells herein. The bitcells may relay the stored information to the so-called backend 120 of the PUF array architecture 100. Backend 120 includes Temporal Majority Voting (TMV) (or dark bit detection (DBD)) module 114, error correction module 116 and NVM 118. Backend 100 may be configured to take unreliable bits from PUF array circuitry 112 and use backend 120 components to correct these errors. TMV is the repetition of reset-evaluation phases using a gated clock and counter to reach a decision as a result of majority outcome. This process is described in greater detail below in relation to FIGS. 3 and 4.

NVM 118 stores helper data which can be used by error correction module 116 to reduce bit error rate from the array. The error-corrected information is then transmitted from error correction module 116 to front end 130.

Front-end 130 includes entropy extraction 132, secure key source 134 and KDF 136. Front-end 130 turns the PUF values into a key (entropy extraction 132), stores the key (secure key source 134) and makes the key available (Key Derivation Function (KDF) 136) through a challenge-response interface as shown schematically by arrows 137 and 138.

As stated, a substantial shortcoming of the conventional PUF architecture is the hackability of the NVM to access the helper data. Once the NVM is accessed, a hacker can replicate data output from the front end so as to evade the challenge-response process 137/138.

This shortcoming can be addressed in an exemplary embodiment by storing the helper data on the PUF array itself. By ways of example, the helper data may be dispersedly stored within the PUF array so that it would not be known whether a bitcell is storing actual data or helper data. The dispersing of the data may be random or pseudo-random. In another embodiment, PMOS- or NMOS-only devices are used along with a more effective hardening mechanism. One such exemplary hardening mechanism is the hot carrier (HC) induced stress. Using the disclosed embodiments, the PUF BER is reduced to below 1% by using PMOS- or NMOS-only devices and a more effective stress hardening mechanism.

In one exemplary embodiment, PUF cell bits can be hardened to their intrinsic (native) value determined by their pre-stress variation. In another exemplary embodiment, PUF cell bits may be programmed to a specific value regardless of the pre-stress variation. To harden the cells, an embodiment of the disclosure uses HC induced stress.

In another embodiment, a PUF cell is selectively programmed to an arbitrary (or specific) value. The cells can be programmed to a desired value (e.g., apriori) and then hardened to lock in the value. To lock in the value, the cell may be hardened using, for example, HC induced stress.

Hot carrier injection occurs when certain amount of carriers along the MOSFET channel gain sufficient kinetic energy and bombard gate dielectric near the drain side. The term hot refers to the effective carrier temperature relative to the lattice temperature. HC stress as applied to the disclosed principles is discussed in greater detail below.

In one exemplary implementation, helper data is programmed into PUF cell bits. To harden the cells, HC induced stress may be used. Once the values are "reinforced" into the cell bits, the probability of erroneous value generation from the cells is marginally small. Thus, the helper data value may be locked in. In certain embodiment, the helper data is distributed through PUF array. The distribution may be random or pseudorandom. In this manner, the helper data remains within the PUF array instead of being stored onto separate fuses or NVM. This makes the PUT array un-hackable as the placement of helper data cannot be determined.

Figure 2:
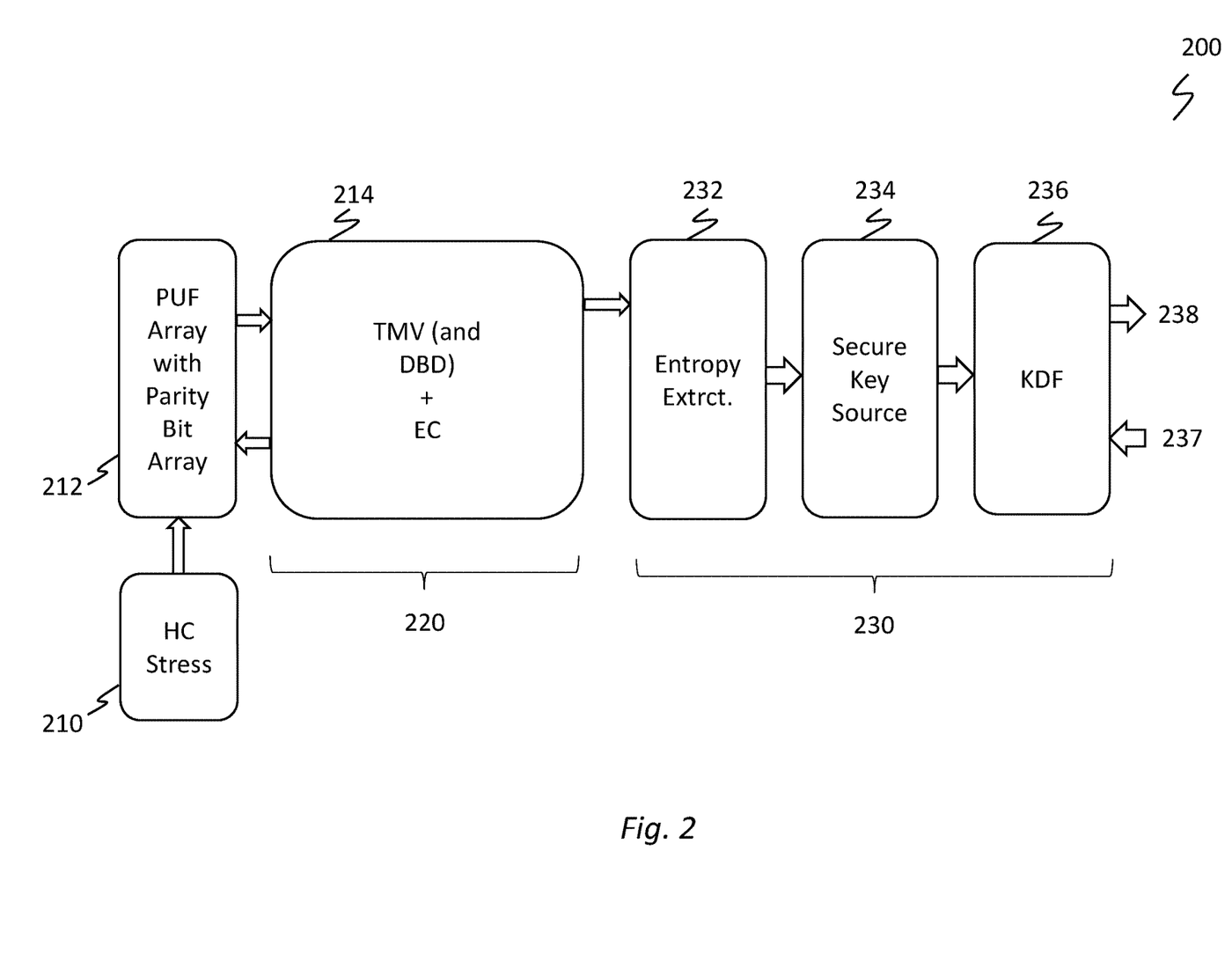
FIG. 2 is an exemplary embodiment of a PUF-based security key hierarchy according to one embodiment of the disclosure.

FIG. 2 is an exemplary embodiment of a PUF-based security key hierarchy according to one embodiment of the disclosure. In FIG. 2, front end 220 is modified according to the disclosed embodiments. Specifically, HC stress 210 is applied to PUF array 212. HC may be applied to PUF array 212 during manufacturing process or during Sort process. The resulting device is a PUF array with parity bits (or helper data) integrated into the same array. The parity bits may be assigned to specific bitcells in the array. Alternatively, the parity bitcells may be randomly disbursed through the array. In FIG. 2, back end 220 includes PUT and parity bits merged into one physical array that yields a reliable, repeatable value. More specifically, the programming of helper data happens within PUF array 212, instead of going out to separate fuses or NVM.

The error correction system 200 programs helper data into the PUT array itself instead of into fuses or off chip NVM. In one embodiment, a PUF bitcell may allow selective hardening or programming through exploiting the shift in transistor electrostatics or on current (Ion) by intentional FIC stress to electrically differentiate a nominally matched transistor pair, thus stabilizing or overwriting the output tendency of a latch from its meta-stable point, or trip point.

Module 214 includes implements TMV and error correction to data received from PUF array 212. Module 214 may also implement DBD on PUT array 212. The front-end process 230 remains substantially similar to that of FIG. 1. Front-end process 230 is shown with entropy extraction 232, secure key source 234 and KDF 236. A challenge-response process is also schematically shown with arrows 237/238. Front end 230 turns PUF values into a secure key (232), stores the secure key (234) and makes the key available (236) directly through a challenge-response process (237/238).

The embodiment of FIG. 2 requires a PUF cell that supports stress hardening to achieve a low BER and to provide a built-in ECC scheme. The embodiment must also support stress programming to allow the helper data to be stored in the array. While stress programming and FIC induced stress are disclosed herein, it should be noted that the disclosed embodiments are mere illustrative of the disclosed principles. Any technique to seal the values into the cell bits may be used well within the disclosed principles.

According to certain disclosed principles, it has been found that HC stress impact on PMOS Ion loss has a positive temperature dependence, while on NMOS, it is a negative temperature dependence (that is, more degradation occurs at a cold temperature than a hot temperature). Thus, for intentional HC stress in manufacturing at Sort (typically −10° C.), the amount of NMOS or PMOS stress time should be shorter or longer than that at Class (typically 90° C.), respectively. Class is test after dies are packaged.

In certain applications, stress induced degradation is permanent and unrecoverable. In some embodiments it was found that only trivial fraction of stressed induced shallow Si/oxide interface traps can recover due to hydrogen passivation. It was also found that the longer the stress time, the more Ion degradation may occur for both N- and PMOS FETs. This leads to using HC stress to program, rather than just hardening, a PUT bitcell.

For typical thin-gate, the relation between current and voltage (Ids-Vgs) is altered as a function of HC stress time. The PMOS and NMOS Ion can degrade by more than 50%, given sufficient stress time. (For the same drive degradation, the stress time can be shortened with higher Vsd and Vsg (for PMOS), for example, Vsd=Vsg=about 1.8V.) The Ion loss due to RC stress is what this disclosure relies on to harden or program the PUT outcome.

Certain experimental data on PUF array from Si simulation has shown that transistor mismatch before stress results in intra- and inter-array Hamming distance of about 50%, or maximum entropy. HC stress to harden the outcome may not degrade the entropy. If the PUF array is programmed using HC stress, it would have near zero entropy and act like fuse. The difference is that the hardening stabilizes the tendency of a meta-stable bit with less stress, while programming overwrites the tendency with more stress.

In one application of outcome hardening, the architecture writes back the logic "1" or "0" depending on each bit's pre-stress output tendency. For programming, the architecture directly writes planned logic "1" or "0" to individual cells and then the array is HC stressed as a whole for longer duration.

Figure 3:
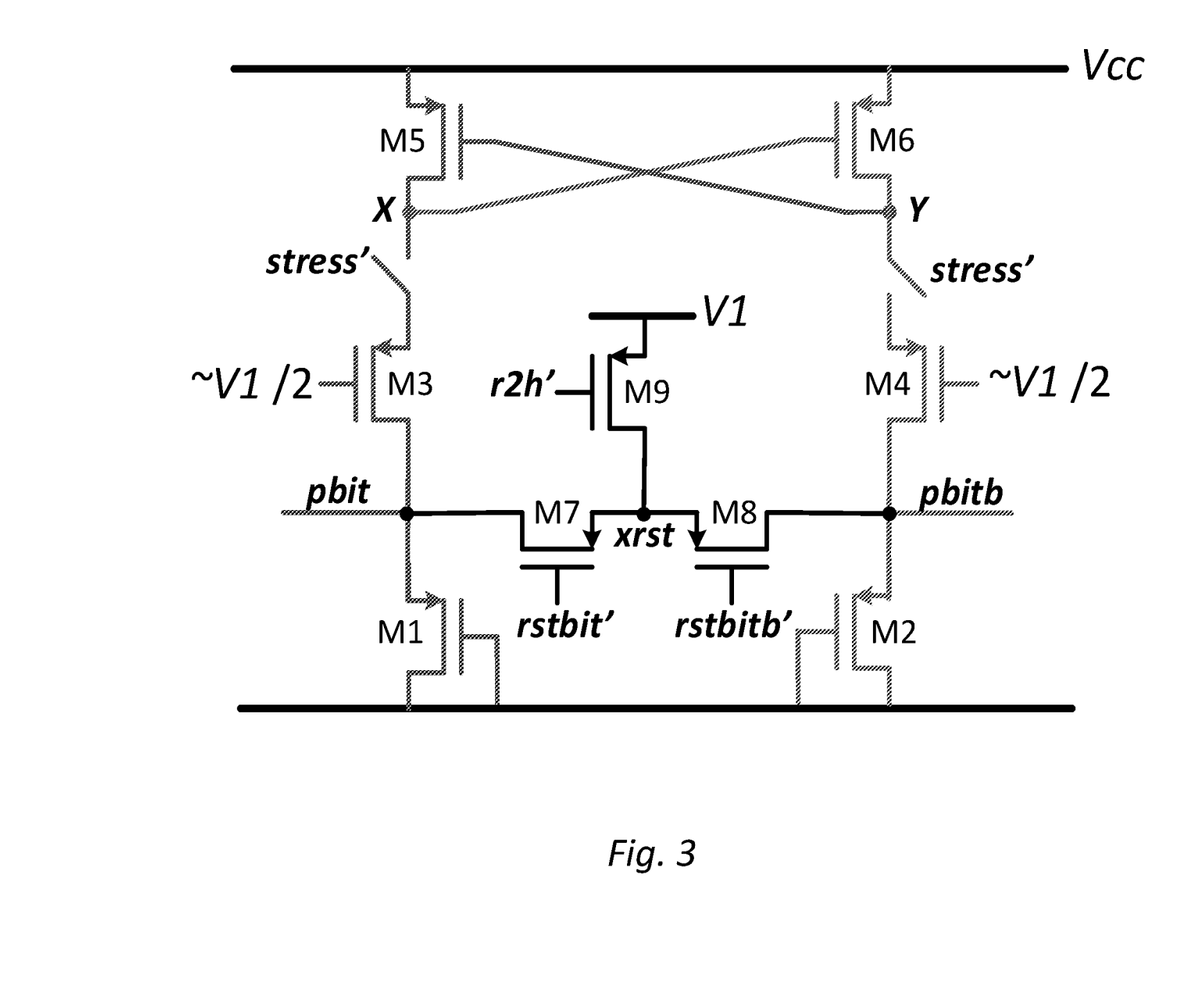
FIG. 3 shows an exemplary PMOS-centric PUF bitcell schematic according to one embodiment of the disclosure.

FIG. 3 shows an exemplary PMOS-centric PUF bitcell schematic according to one embodiment of the disclosure. Circuit 300 of FIG. 3 is substantially left-to-right symmetrical (schematic as well as layout). The circuit of FIG. 3 consists of a pair of cross-coupled PMOS (M5 (322) and M6 (304)) loaded with identical diode-connected PMOS (M1 (318) and M2(312)). Gates of M3 (320) and M4 (308) are connecting to about (V1)/2 to avoid potential gate oxide breakdown when V1 (328) is raised for FIC stress, where V1 (328) is a separate voltage supply from Vcc (302). During normal read operation V1 (302) can be at Vcc (302) voltage.

During HC stress operation, V1 (328) is raised high, to 1.8V for example. When stress' (306) is low, the associated switch pair is turned NOT connecting. The outputs are pbit and pbitb whose downstream buffers/logics (not shown) restore the complementary outputs rail-to-rail. M7 (316), M8 (310), and M9 (314) are for Reset and/or HC stress. Inverter M1(318)-M3(320)-M5(322) (blue-left with input: Y and output: pbit) and M2(312)-M4(308)-M6(304) (red-right with input: X and output: pbitb) are sized to ensure both the inverters have voltage gain >1, provided stress' (324) signal is HIGH and thereby the associated switches are connecting. The bitcell 300 of FIG. 3 simplifies the transistor variation to almost PMOS only, avoiding NMOS's different threshold voltage and drive sensitivity to process, temperature and supply voltage. The bitcell 300 can run in (1) normal operation, and (2) HC stress with a simplified diagram as shown FIG. 4 which represents a timing diagram of normal operation and HC stress operation according to one embodiment of the disclosure.

Figure 4:
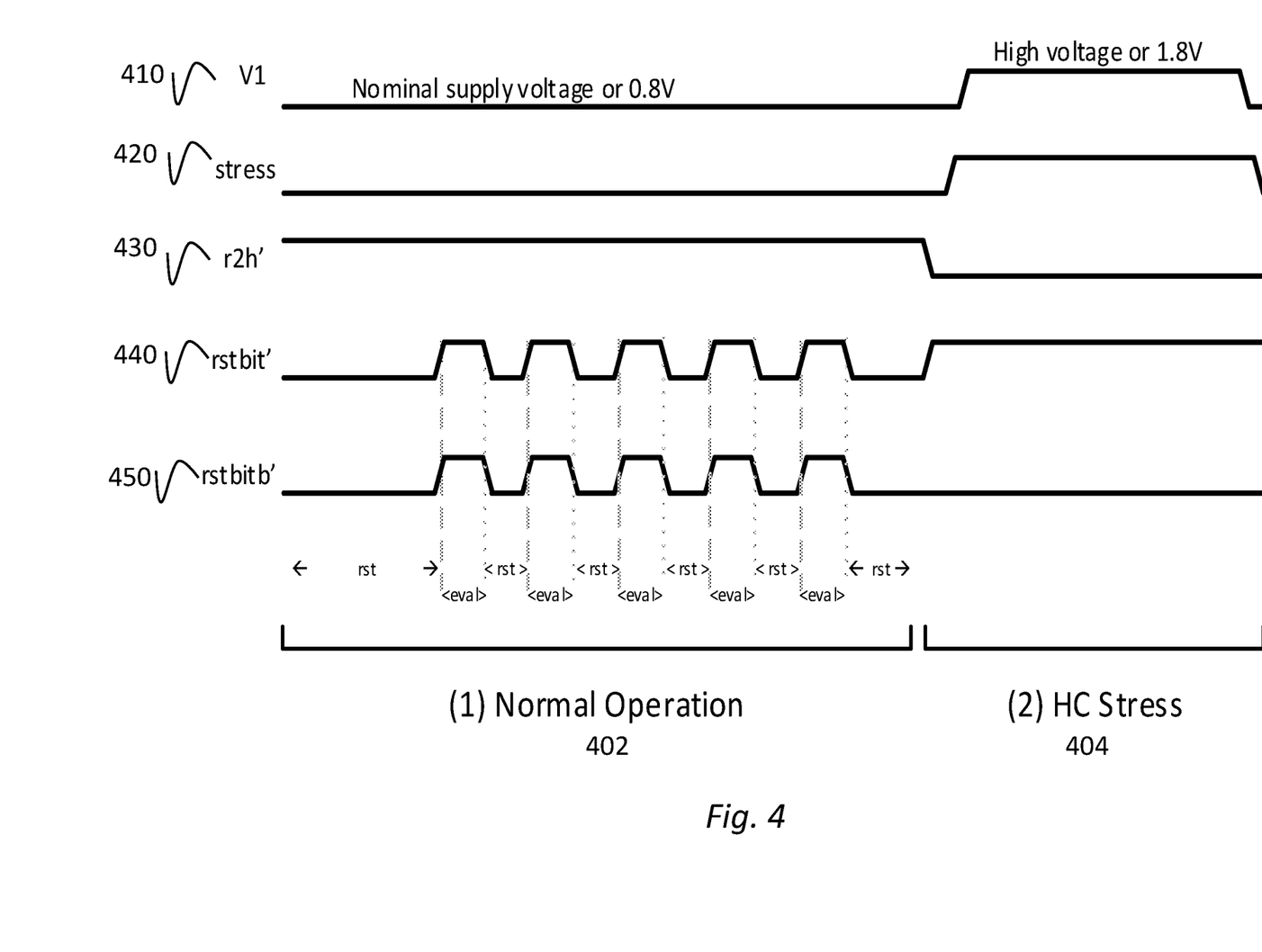
FIG. 4 which represents a timing diagram of normal operation and FIC stress operation according to one embodiment of the disclosure.

Normal Operation (402)—Here, there is Reset phase, or "rst" in FIG. 4, where M9 (FIG. 3) is off (while r2*h*'(430) =high), M7 (FIG. 3) and M8 (FIG. 3) are on (while rstbit'=rstbitb'=low), shorting pbit and pbitb close to the trip voltages of M1-M3-M5 (FIG. 3) and M2-M4-M6 (FIG. 3) inverters. Such a reset-to-trip-voltage scheme should reduce the probability of 'wrong decision' for the following evaluation phase, or 'eval' in FIG. 4. In the evaluation phase, M7, M8 (and of course M9) (FIG. 3) are off, pbit and pbitb voltages start to deviate from each other through the positive feedback initiated by the negative gm cell M5-and-M6 (FIG. 3). Because of the bitcell symmetry, the dominant transistor mismatch and noise of M1-M6 (FIG. 3) should determine majority of pbit and pbitb outcome out of all evaluation repeats (e.g., best 8 out of 15 repeats) which average away the noise influence. Called Temporal Majority Voting (TMV), the repetition of reset-evaluation phases using a gated clock and counter to reach a decision as a result of majority outcome. In FIG. 4, it illustrates TMV of 5-time evaluation repeats.

HC Stress (404)—This operation is designed for one time use in high volume manufacturing at Sort for HC stress 404. Either input rstbit' (440) or rstbitb' (450) should go low, thus stressing either M1 with large |Vds| along current flow path M9-M7-M1 (FIG. 3), or M2 (FIG. 3) with large |Vds| along current flow path M9-M8-M2 (FIG. 3), respectively. Once either path is turned ON, V1 (410) increases to enlarge the Vds (of M1 or M2) for stronger HC stress effect after signal stress (420) promptly primes. The stress signal going high cuts M5, M6 (FIG. 3) from HC stress. M3 and M4 (FIG. 4) with gate voltage equal to ~(V1)/2 prevent gate oxide breakdown risk when V1 (410) is raised during HC stress. For instance, rstbit' (440) goes high while rstbitb' (450) stays low, resulting in M7 (FIG. 3) turning off while dc current flows from V1 through M9, M8, M2 (FIG. 3) to ground with nearly all of the voltage drop on Vsd and Vsg of M2 (FIG. 3). M9 (FIG. 3) can be removed and we short node xrst to V1 to further increase M2 Vsd (and Vsg) at the same V1 (410) level.

Figure 5:
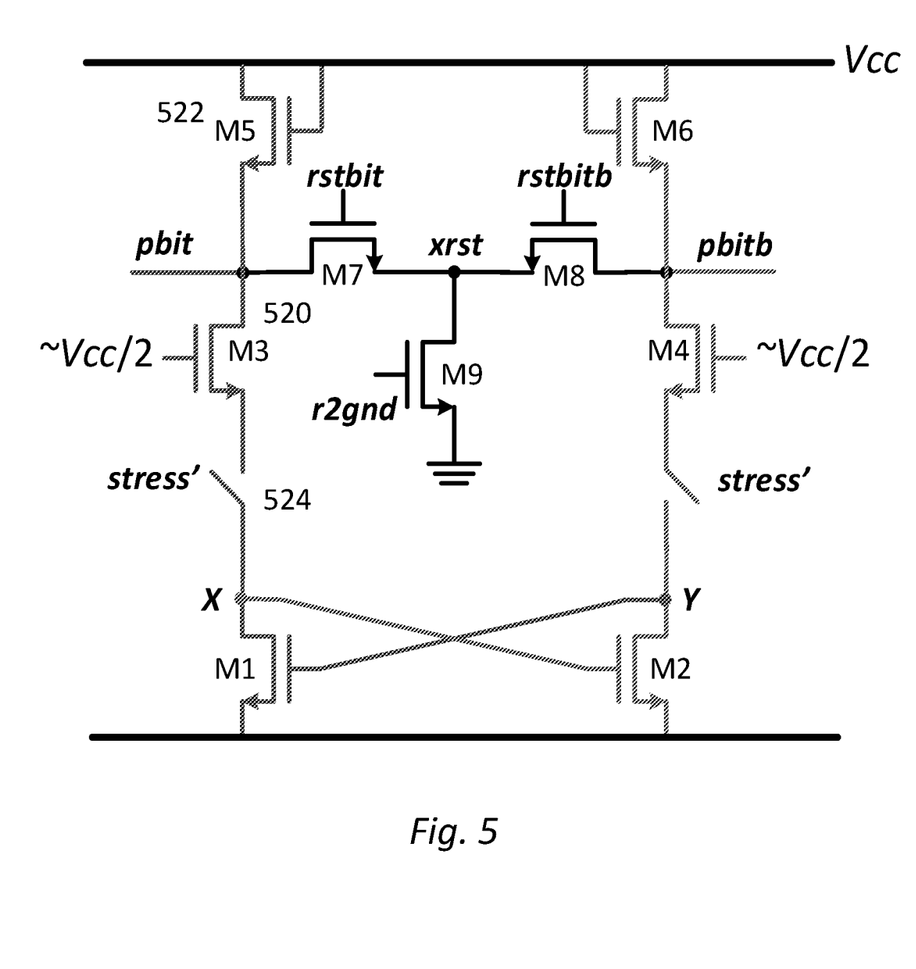
FIG. 5 shows a circuit diagram for an NMOS-centric PUF according to one embodiment of the disclosure.

FIG. 5 shows a circuit schematic for an NMOS-centric PUF 500 according to one embodiment of the disclosure. Compared to FIG. 3, this embodiment needs only one voltage supply Vcc; V1 is no longer required. Here, the switch pair associated with stress' 524 is connecting when stress' is HIGH (or stress is LOW). The input signal timing diagram for normal operation and HC stress of FIG. 5 is similar to that shown in FIG. 4. The transistor to be HC stressed can be either M5 (522) or M6 (540). M3 (520) and M4 (508) with gate voltage equal to ~Vcc/2 prevent gate oxide breakdown risk when Vcc is raised during HC stress.

The exemplary PUF cells disclosed above facilitate absorbing the NVM content (parity bits) into the PUF array, illustrated in FIG. 2, using the proposed PUF bitcell and HC stress. Thus, a hacker will face a larger array where fractional and randomized part of it is FIC stressed longer or harder as parity bits.

Figure 6:
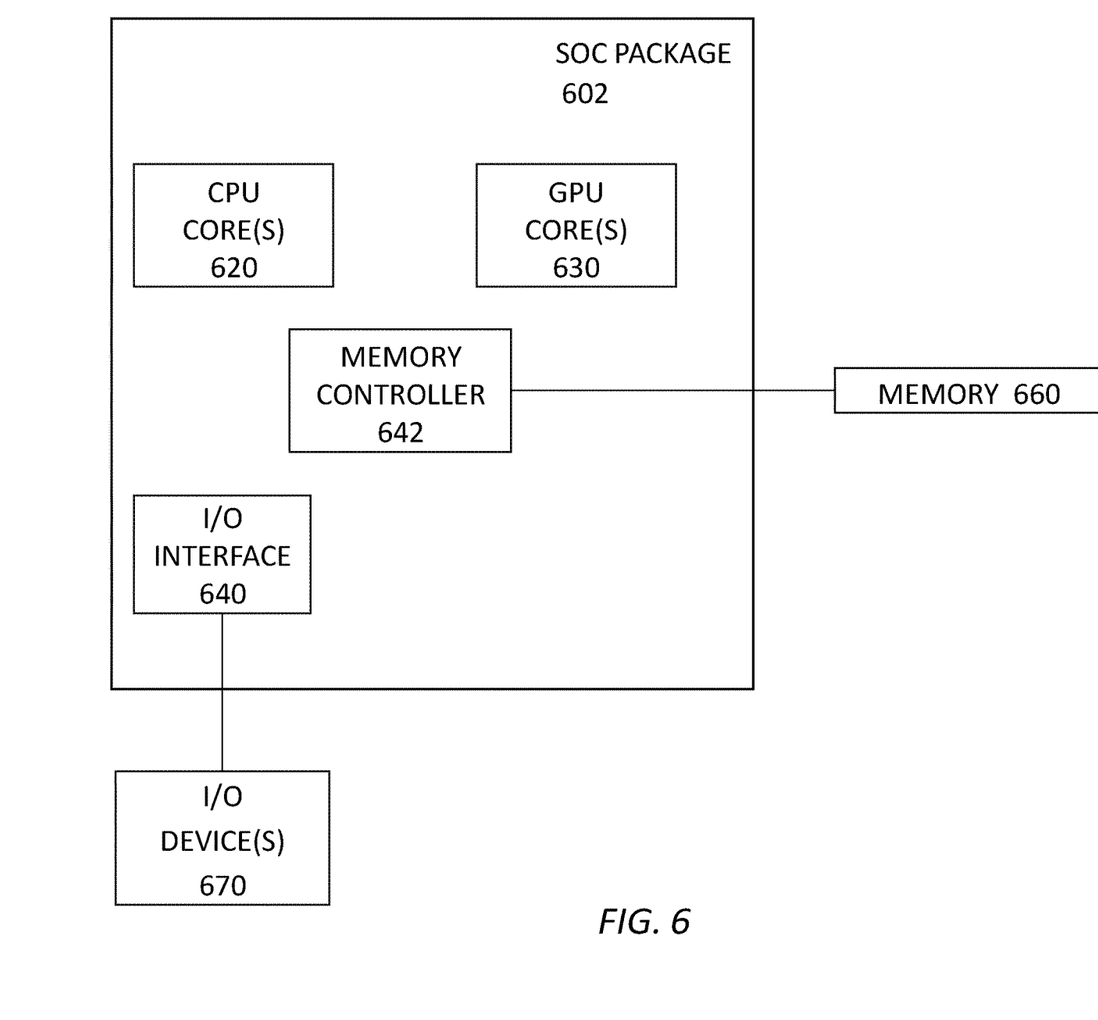
FIG. 6 shows a circuit diagram according to another embodiment of the disclosure for a PMOS-centric PUT.

FIG. 6 illustrates an exemplary chipset that may be used with the disclosed PUF array. By way of example, SOC package 602 may be used in connection with the PUF array to implement the secure key validation check as discussed above. SOC 602 includes one or more Central Processing Unit (CPU) cores 620, one or more Graphics Processor Unit (GPU) cores 630, an Input/Output (I/O) interface 640, and a memory controller 642. Various components of the SOC package 602 may be coupled to an interconnect or bus such as discussed herein with reference to the other figures. Also, the SOC package 602 may include more or less components, such as those discussed herein with reference to the other figures. Further, each component of the SOC package 602 may include one or more other components, e.g., as discussed with reference to the other figures herein. In one embodiment, SOC package 602 (and its components) is provided on one or more Integrated Circuit (IC) die, e.g., which are packaged into a single semiconductor device.

SOC package 602 may be coupled to a memory 660 via the memory controller 642. Though not shown, memory 660 (or a portion of it) can be integrated on the SOC package 602. Memory 602 may store instructions executable on CPU Cores 620 or GPU Cores 630. The instructions may cause SoC package 602 to implement the FuSa validation steps according to certain disclosed embodiments.

The I/O interface 640 may be coupled to one or more I/O devices 670, e.g., via an interconnect and/or bus such as discussed herein with reference to other figures. I/O interface and I/O devices may be optionally integrated into the SoC 602. I/O device 670 may be integrated into SoC package 602 as General Purpose I/O (GPIO). In certain embodiments, an external I/O device(s) 670 may include one or more of a keyboard, a mouse, a touchpad, a display, an image/video capture device (such as a camera or camcorder/video recorder), a touch screen, a speaker, or the like.

Figure 7:
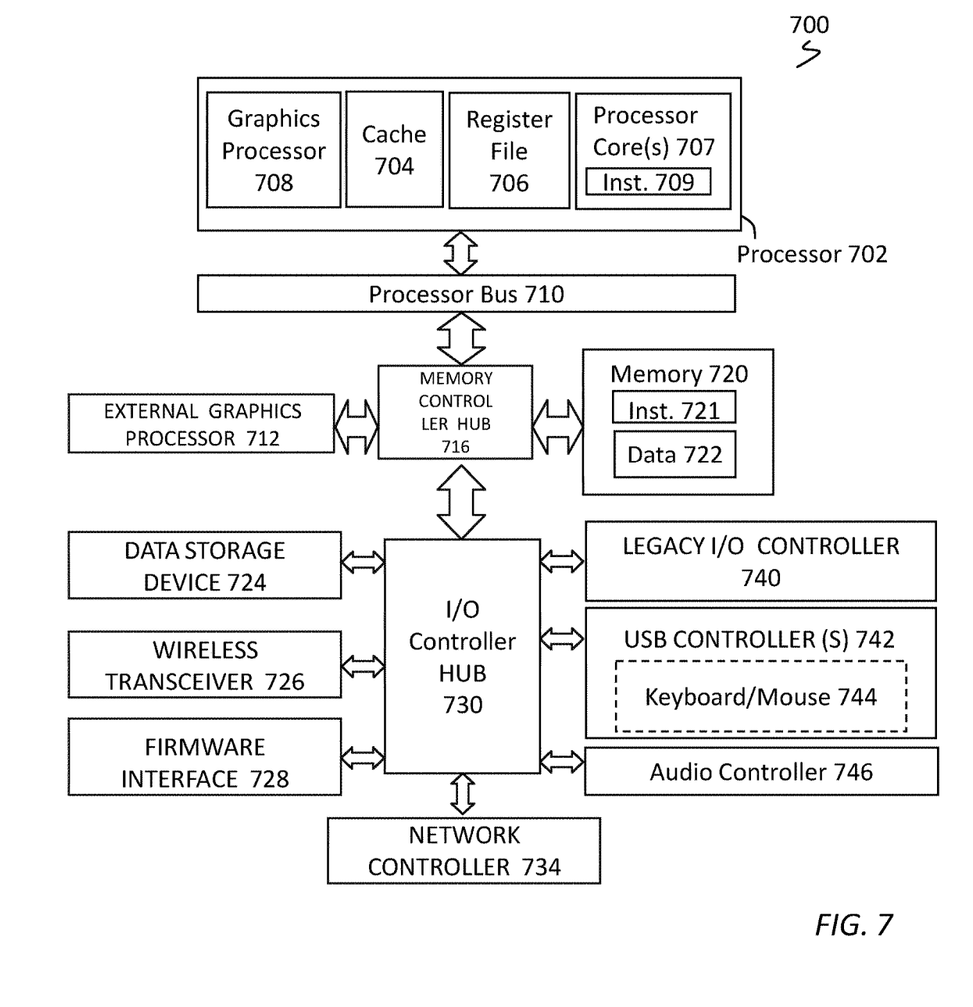
FIG. 7 FIG. 7 is a block diagram of a processing system 700, according to an embodiment of the disclosure.

SoC package 602 (and the disclosed PUF circuits) may be part of a larger circuitry such as a board, an integrated circuit or a processing system. FIG. 7 is a block diagram of a processing system 700, according to an embodiment of the disclosure. In various embodiments the system 500 includes one or more processors 702 and one or more graphics processors 708, and may be a single processor desktop system, a multiprocessor workstation system, or a server system having a large number of processors 702 or processor cores 707. In on embodiment, the system 700 is a processing platform incorporated within a system-on-a-chip (SoC or SOC) integrated circuit for use in mobile, handheld, or embedded devices.

An embodiment of system 700 can include, or be incorporated within a server-based gaming platform, a game console, including a game and media console, a mobile gaming console, a handheld game console, or an online game console. In some embodiments system 700 is a mobile phone, smart phone, tablet computing device or mobile Internet device. Data processing system 700 can also include, couple with, or be integrated within a wearable device, such as a smart watch wearable device, smart eyewear device, augmented reality device, or virtual reality device. In some embodiments, data processing system 700 is a television or set top box device having one or more processors 702 and a graphical interface generated by one or more graphics processors 708.

In some embodiments, the one or more processors 702 each include one or more processor cores 707 to process instructions which, when executed, perform operations for system and user software. In some embodiments, each of the one or more processor cores 707 is configured to process a specific instruction set 709. In some embodiments, instruction set 709 may facilitate Complex Instruction Set Computing (CISC), Reduced Instruction Set Computing (RISC), or computing via a Very Long Instruction Word (VLIW). Multiple processor cores 707 may each process a different instruction set 709, which may include instructions to facilitate the emulation of other instruction sets. Processor core 707 may also include other processing devices, such a Digital Signal Processor (DSP).

In some embodiments, the processor 702 includes cache memory 704. Depending on the architecture, the processor 702 can have a single internal cache or multiple levels of internal cache. In some embodiments, the cache memory is shared among various components of the processor 702. In some embodiments, the processor 702 also uses an external cache (e.g., a Level-3 (L3) cache or Last Level Cache (LLC)) (not shown), which may be shared among processor cores 707 using known cache coherency techniques. A register file 706 is additionally included in processor 702 which may include different types of registers for storing different types of data (e.g., integer registers, floating point registers, status registers, and an instruction pointer register). Some registers may be general-purpose registers, while other registers may be specific to the design of the processor 702.

In some embodiments, processor 702 is coupled to a processor bus 710 to transmit communication signals such as address, data, or control signals between processor 702 and other components in system 700. In one embodiment the system 700 uses an exemplary 'hub' system architecture, including a memory controller hub 716 and an Input Output (I/O) controller hub 730. A memory controller hub 716 facilitates communication between a memory device and other components of system 700, while an I/O Controller Hub (ICH) 730 provides connections to I/O devices via a local I/O bus. In one embodiment, the logic of the memory controller hub 716 is integrated within the processor.

Memory device 720 can be a dynamic random-access memory (DRAM) device, a static random-access memory (SRAM) device, flash memory device, phase-change memory device, or some other memory device having suitable performance to serve as process memory. In one embodiment the memory device 720 can operate as system memory for the system 700, to store data 722 and instructions 721 for use when the one or more processors 702 executes an application or process. Memory controller hub 716 also couples with an optional external graphics processor 712, which may communicate with the one or more graphics processors 708 in processors 702 to perform graphics and media operations.

In some embodiments, ICH 730 enables peripherals to connect to memory device 720 and processor 702 via a high-speed FO bus. The I/O peripherals include, but are not limited to, an audio controller 746, a firmware interface 728, a wireless transceiver 726 (e.g., Wi-Fi, Bluetooth), a data storage device 724 (e.g., hard disk drive, flash memory, etc.), and a legacy I/O controller 740 for coupling legacy (e.g., Personal System 2 (PS/2)) devices to the system. One or more Universal Serial Bus (USB) controllers 742 connect input devices, such as keyboard and mouse 744 combinations. A network controller 734 may also couple to ICH 730. In some embodiments, a high-performance network controller (not shown) couples to processor bus 710. It will be appreciated that the system 700 shown is exemplary and not limiting, as other types of data processing systems that are differently configured may also be used. For example, the I/O controller hub 730 may be integrated within the one or more processor 702, or the memory controller hub 716 and I/O controller hub 730 may be integrated into a discreet external graphics processor, such as the external graphics processor 712.

ADDITIONAL NOTES & EXAMPLES

The following exemplary embodiments are further provided to illustrate different applications of the disclosed principles. The exemplary embodiments are non-limiting.

Example 1 is directed to a Physically Unclonable Function (PUF) circuit array, comprising: a plurality of first data bits and a plurality of second data bits; a write circuitry configured to store a plurality of first data bits into a respective ones of the plurality of first bitcells and to store a plurality of second data bits to a respective ones of the plurality of second bitcells, the plurality of first bitcells defining a first dataset and the plurality of second data bits defining a helper dataset; a parity bit array configured to read the helper dataset from the plurality of second bitcells and to apply an error correction factor as a function of the helper data to the first read dataset to form a security key dataset; and a bus to output the security key dataset from the PUF circuit array; wherein the first dataset and the second dataset are stored on the PUF circuit array and wherein the PUF circuit array is configured to output a unique static random value based on a substantially constant value read from each of the plurality of first and second bitcells of the PUF circuit array.

Example 2 is directed to the PUF circuit array of example 1, wherein the second bitcells are selectively programmable.

Example 3 is directed to the PUF circuit array of example 1, further comprising a read circuitry configured to read the first dataset from the plurality of first bitcells to provide a first read dataset to the parity bit array.

Example 4 is directed to the PUF circuit array of example 1, wherein each of the plurality of first bitcells or the second bitcells defines one of a PMOS or an NMOS.

Example 5 is directed to the PUF circuit array of example 1, wherein the helper data comprises a redundant data to apply error correction to the first dataset.

Example 6 is directed to the PUF circuit array of example 1, wherein each of the plurality of second bitcells is hardened to substantially retain a value stored at each respective bitcell.

Example 7 is directed to the PUF circuit array of example 5, wherein each of the plurality of second bitcells is hardened after storing a respective second data bit.

Example 8 is directed to the PUF circuit array of example 6, wherein each of the plurality of second bitcells is hardened through hot carrier (FIC) stress hardening.

Example 9 is directed to the PUF circuit array of example 1, wherein the first bitcells and the second bitcells are integrated into the PUF circuit array.

Example 10 is directed to the PUF circuit array of example 9, wherein the first dataset and the helper dataset are integrated on the PUF circuit array.

Example 11 is directed to the PUF circuit array of example 1, wherein the plurality of second bitcells comprise parity bitcells.

Example 12 is directed to at least one non-transitory machine-readable medium comprising instructions that, when executed by computing hardware, including a Physically Unclonable Function (PUF) array circuit coupled to a memory circuitry, causes the computing hardware to: store a plurality of first data bits into a respective ones of a plurality of first bitcells of the PUF circuitry array to form a first dataset; store a plurality of second data bits into a respective ones of a plurality of second bitcells of the PUF circuitry array, the plurality of second data bits defining a helper dataset; read the first dataset from the plurality of first bitcells to provide a first read dataset; apply an error correction factor to the first read data dataset to form a security key dataset; and output the security key dataset from the PUT circuit array; wherein the first dataset and the second dataset are stored on the PUF circuitry array and wherein the PUF circuit array is configured to output a unique static random value based on a substantially constant value read from each of the plurality of first and second bitcells of the PUF circuit array.

Example 13 is directed to the medium of example 12, wherein each of the plurality of first bitcells or the second bitcells defines one of a PMOS or an NMOS.

Example 14 is directed to the medium of example 12, wherein the helper data comprises a redundant data to apply error correction after reading the first dataset.

Example 15 is directed to the medium of example 12, wherein each of the plurality of second bitcells is hardened to substantially retain a value stored at each respective bitcell, Example 16 is directed to the medium of example 15, wherein the instructions further cause the computing hardware to store a plurality of second data bits into each of the respective ones of the plurality of second bitcells and substantially locking the stored values by hardening the second bitcells.

Example 17 is directed to the medium of example 15, wherein each of the plurality of second bitcells is hardened through hot carrier (HC) stress hardening.

Example 18 is directed to the medium of example 12, wherein the first bitcells and the second bitcells define the RIF circuit array.

Example 19 is directed to the medium of example 12, wherein the plurality of second bitcells comprise parity bitcells.

Example 20 is directed to the medium of example 19, wherein the first dataset and the helper dataset are integrated on the NH circuit array.

Example 21 is directed to a method to provide data from a Physically Unclonable Function (PUF) circuit array, the method comprising: storing a plurality of first data bits into a respective ones of a plurality of first bitcells of the PUT circuitry array to form a first dataset; storing a plurality of second data bits into a respective ones of a plurality of second bitcells of the PUF circuitry array, the plurality of second data bits defining a helper dataset; reading the first dataset from the plurality of first bitcells to provide a first read dataset; applying an error correction factor to the first read data dataset to form a security key dataset; and outputting the security key dataset from the PUF circuit array; wherein the first dataset and the second dataset are stored on the RIF circuitry array and wherein the RIF circuit array is configured to output a unique static random value based on a substantially constant value read from each of the plurality of first and second bitcells of the PUF circuit array.

Example 22 is directed to the method of example 21, wherein each of the plurality of first bitcells or the second bitcells defines one of a PMOS or an NMOS.

Example 23 is directed to the method of example 21, wherein the helper data comprises a redundant data to apply error correction after reading the first dataset.

Example 24 is directed to the method of example 21, wherein each of the plurality of second bitcells is hardened to substantially retain a value stored at each respective bitcell, Example 25 is directed to the method of example 24, further comprising storing a plurality of second data bits into each of the respective ones of the plurality of second bitcells and substantially locking the stored values by hardening the second bitcells.

Example 26 is directed to the method of example 24, wherein each of the plurality of second bitcells is hardened through hot carrier (HC) stress hardening.

Example 27 is directed to the method of example 21, wherein the first bitcells and the second bitcells define the PUF circuit array.

Example 28 is directed to the method of example 21, wherein the plurality of second bitcells comprise parity bitcells.

Example 29 is directed to the method of example 28, wherein the first dataset and the helper dataset are integrated on the PUF circuit array.

What is claimed is:

1. A Physically Unclonable Function (PUF) circuit array, comprising:
   a plurality of first data bits and a plurality of second data bits;
   a write circuitry configured to store a plurality of first data bits into a respective ones of the plurality of first bitcells and to store a plurality of second data bits to a respective ones of the plurality of second bitcells, the plurality of first bitcells defining a first dataset and the plurality of second data bits defining a helper dataset;
   a parity bit array configured to read the helper dataset from the plurality of second bitcells and to apply an error correction factor as a function of the helper data to the first read dataset to form a security key dataset; and
   a bus to output the security key dataset from the PUF circuit array;
   wherein the first dataset and the second dataset are stored on the PUF circuit array and wherein the PUF circuit array is configured to output a unique static random value based on a substantially constant value read from each of the plurality of first and second bitcells of the PUF circuit array.

2. The PUF circuit array of claim 1, wherein the second bitcells are selectively programmable.

3. The PUF circuit array of claim 1, further comprising a read circuitry configured to read the first dataset from the plurality of first bitcells to provide a first read dataset to the parity bit array.

4. The PUF circuit array of claim 1, wherein each of the plurality of first bitcells or the second bitcells defines one of a PMOS or an NMOS.

5. The PUF circuit array of claim 1, wherein the helper data comprises a redundant data to apply error correction to the first dataset.

6. The PUF circuit array of claim 1, wherein each of the plurality of second bitcells is hardened to substantially retain a value stored at each respective bitcell.

7. The PUF circuit array of claim 5, wherein each of the plurality of second bitcells is hardened after storing a respective second data bit.

8. The PUF circuit array of claim 6, wherein each of the plurality of second bitcells is hardened through hot carrier (HC) stress hardening.

9. The PUF circuit array of claim 1, wherein the first bitcells and the second bitcells are integrated into the PUF circuit array.

10. The PUF circuit array of claim 9, wherein the first dataset and the helper dataset are integrated on the PUF circuit array.

11. The PUF circuit array of claim 1, wherein the plurality of second bitcells comprise parity bitcells.

12. At least one non-transitory machine-readable medium comprising instructions that, when executed by computing hardware, including a Physically Unclonable Function (PUF) array circuit coupled to a memory circuitry, causes the computing hardware to:
   store a plurality of first data bits into a respective ones of a plurality of first bitcells of the PUF circuitry array to form a first dataset;
   store a plurality of second data bits into a respective ones of a plurality of second bitcells of the PUF circuitry array, the plurality of second data bits defining a helper dataset;
   read the first dataset from the plurality of first bitcells to provide a first read dataset;
   apply an error correction factor to the first read data dataset to form a security key dataset; and
   output the security key dataset from the PUF circuit array;
   wherein the first dataset and the second dataset are stored on the PUF circuitry array and wherein the PUF circuit array is configured to output a unique static random value based on a substantially constant value read from each of the plurality of first and second bitcells of the PUF circuit array.

13. The medium of claim 12, wherein each of the plurality of first bitcells or the second bitcells defines one of a PMOS or an NMOS.

14. The medium of claim 12, wherein the helper data comprises a redundant data to apply error correction after reading the first dataset.

15. The medium of claim 12, wherein each of the plurality of second bitcells is hardened to substantially retain a value stored at each respective bitcell.

16. The medium of claim 15, wherein the instructions further cause the computing hardware to store a plurality of second data bits into each of the respective ones of the plurality of second bitcells and substantially locking the stored values by hardening the second bitcells.

17. The medium of claim 15, wherein each of the plurality of second bitcells is hardened through hot carrier (HC) stress hardening.

18. The medium of claim 12, wherein the first bitcells and the second bitcells define the PUF circuit array.

19. The medium of claim 12, wherein the plurality of second bitcells comprise parity bitcells.

20. The medium of claim 19, wherein the first dataset and the helper dataset are integrated on the PUF circuit array.

21. A method to provide data from a Physically Unclonable Function (PUF) circuit array, the method comprising:

storing a plurality of first data bits into a respective ones of a plurality of first bitcells of the PUF circuitry array to form a first dataset;

storing a plurality of second data bits into a respective ones of a plurality of second bitcells of the PUF circuitry array, the plurality of second data bits defining a helper dataset;

reading the first dataset from the plurality of first bitcells to provide a first read dataset;

applying an error correction factor to the first read data dataset to form a security key dataset; and outputting the security key dataset from the PUF circuit array;

wherein the first dataset and the second dataset are stored on the PUF circuitry array and wherein the PUF circuit array is configured to output a unique static random value based on a substantially constant value read from each of the plurality of first and second bitcells of the PUF circuit array.

22. The method of claim 21, wherein each of the plurality of first bitcells or the second bitcells defines one of a PMOS or an NMOS.

23. The method of claim 21, wherein the helper data comprises a redundant data to apply error correction after reading the first dataset.

24. The method of claim 21, wherein each of the plurality of second bitcells is hardened to substantially retain a value stored at each respective bitcell.

25. The method of claim 24, further comprising storing a plurality of second data bits into each of the respective ones of the plurality of second bitcells and substantially locking the stored values by hardening the second bitcells.

26. The method of claim 24, wherein each of the plurality of second bitcells is hardened through hot carrier (HC) stress hardening.

27. The method of claim 21, wherein the first bitcells and the second bitcells define the PUF circuit array.

28. The method of claim 21, wherein the plurality of second bitcells comprise parity bitcells.

29. The method of claim 28, wherein the first dataset and the helper dataset are integrated on the PUF circuit array.

* * * * *